UNITED STATES PATENT OFFICE.

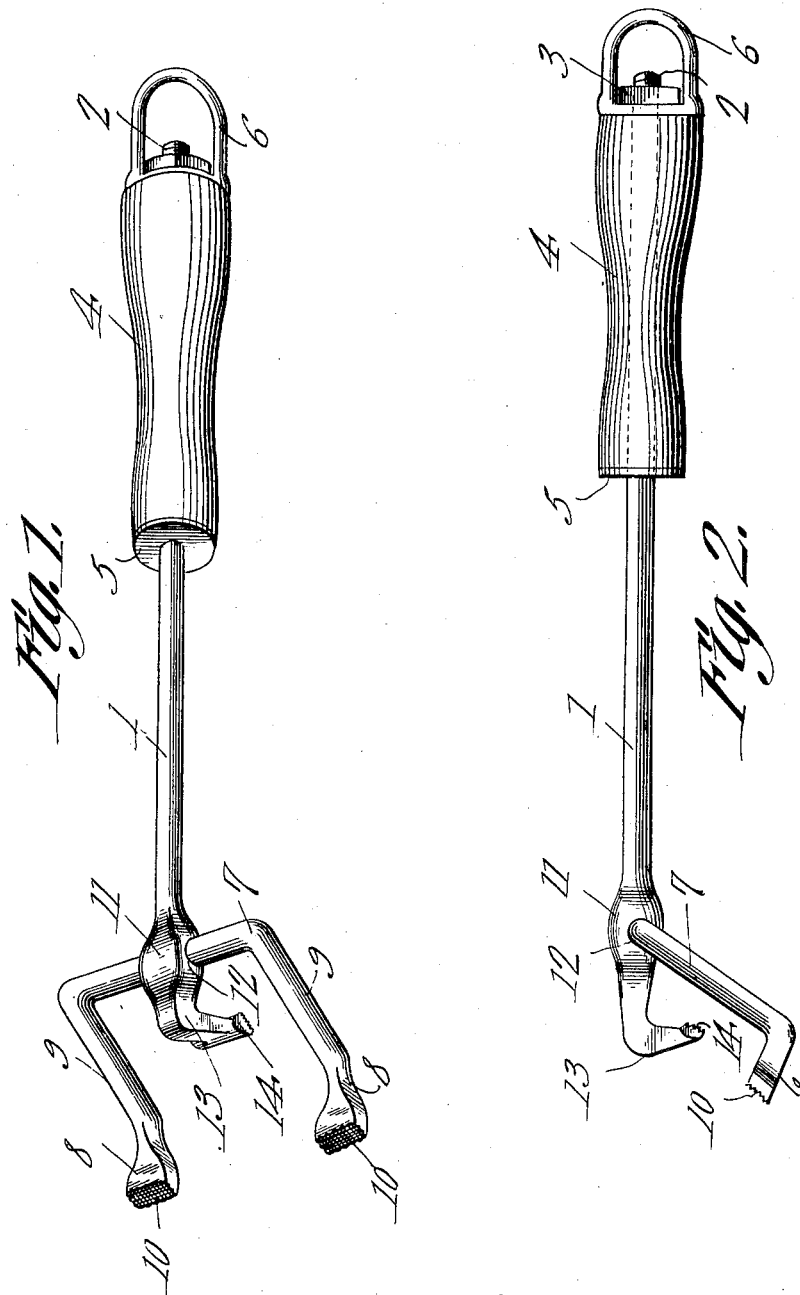

WALKER BEE DUNSON, OF LAGRANGE, GEORGIA.

PAN-LIFTER.

1,083,808. Specification of Letters Patent. Patented Jan. 6, 1914.

Application filed March 13, 1913. Serial No. 754,109.

*To all whom it may concern:*

Be it known that I, WALKER BEE DUNSON, a citizen of the United States, residing at Lagrange, in the county of Troup and State of Georgia, have invented a new and useful Pan-Lifter, of which the following is a specification.

This invention relates to improvements in pan lifters.

An object of the present invention is to provide an improved pan lifter whereby a pan may be easily engaged and lifted.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in perspective showing my improved pan lifter. Fig. 2 is a side view in elevation thereof.

Referring to the drawings in which similar reference numerals designate corresponding parts throughout the several views, 1 is a cylindrical rod the rear end of which is threaded as at 2 to which is secured the retaining nut 3. The nut 3 tightens a handle 4 against a ring 5 to hold the said handle securely in place. The apertured ring 5 is rigidly secured to the cylindrical rod 1 and serves as a stop or shoulder against which the handle 4 contacts. The holding or supporting member 6 is provided with a loop which extends beyond the end 2 of the rod 1 and serves as a means whereby the improved pan lifter may be suspended. The handle 4 is formed of some material having a high thermal resistance, wood being an example of the same.

The front end of my improved pan lifter comprises the U-shaped member 7 the same being formed from a single length of the cylindrical rod bent into the U-shaped form as described and the ends 8 thereof are enlarged or claw-like in form and project substantially at right angles to the legs 9. The outer surface of the ends 8 are serrated as at 10 and are adapted to grip the side walls of a pan. The cylindrical rod 1 is enlarged as at 11 and provided with an aperture 12 extending therethrough. The gripping member 7 extends through the said aperture 12 it being noted that one of the ends 8 are left in their cylindrical form until the said member has been suitably positioned within the said aperture 12. The portion 11 of the cylindrical rod 1 is then compressed against the member 7 to hold the same rigidly in place, it being noted that the same may be brazed to the rod 1 to thereby form a substantially integral structure. The front end of the rod 1 is bent downward as at 13, the lower inner face of which is serrated as at 14 and the same is adapted to contact with the side walls of the pan and the three serrated faces 14, 10 and 10 are adapted to grip a pan to provide means whereby the same may be lifted.

From the foregoing it will be apparent that I have devised an improved form of pan lifter in which the various parts are substantial in construction and so designed that the various parts will be rigid and an improved pan lifter secured. The long rod 1 provides that the handle 4 may be spaced a considerable distance from the lifting end of the device and that therefore there will be no likelihood of the user's hand being burnt. Furthermore it will be noted that the cylindrical rod 1 is provided with an aperture extending through an enlarged portion thereof through which aperture extends a U-shaped gripping member with forwardly projecting serrated faces. Also the front extremity of the rod projects beyond said gripping member and is provided with a downwardly extending end, the inner face of which is serrated and a side wall of a pan may therefore be engaged by the two serrated surfaces 10 upon the outside thereof and the side wall may extend between the legs 9 of the gripping member and the serrated face 14. The serrated face 14 will then engage the inner surface of the pan side wall and obtain a sufficient purchase thereon. The pan may then be lifted and successfully handled.

Having thus fully described the invention what I claim to be new and original with me is:—

1. A pan lifter comprising a rod, said rod provided with an enlarged portion adjacent the front end thereof and with an aperture extending transversely therethrough, a U-shaped gripping member extending through said aperture and positioned substantially central with respect thereto, the legs of said U-shaped member projecting downwardly and forwardly and with the ends thereof bent sharply upward and at right angles to the said legs, the front end of said rod bent downwardly and inwardly and positioned substantially central with respect to the upstanding ends of said legs.

2. A pan lifter comprising an elongated rod with a handle at one end thereof, said rod provided with an enlarged portion adjacent its remote end, said enlarged portion provided with an aperture extending transversely therethrough, a U-shaped gripping member with the base thereof passing through and located substantially central of said aperture and rigidly secured so positioned, the plane of the legs of said U-shaped gripping member extending at an angle to the said rod and being inclined downwardly and forwardly, the extremities of the legs of said U-shaped member bent sharply upwardly and at right angles to the said legs and with the extreme ends thereof serrated, the front end of said rod hooked downwardly and inwardly and provided with a serrated face located substantially central of the aforementioned serrated portions.

In testimony that I claim the foregoing as my own, I have hereto affixed my signature in the presence of two witnesses.

WALKER BEE DUNSON.

Witnesses:
B. F. BALDWIN,
R. B. GUNN.

Copies of this patent may be obtained for five cents each, by addressing the "Commissioner of Patents, Washington, D. C."